United States Patent [19]

Venema

[11] Patent Number: 4,637,621
[45] Date of Patent: Jan. 20, 1987

[54] ACTIVE SHOCK ABSORBING SYSTEM FOR A VEHICLE

[75] Inventor: Harry J. Venema, Wheaton, Ill.

[73] Assignee: Borg-Warner Corporation, Chicago, Ill.

[21] Appl. No.: 750,201

[22] Filed: Jul. 1, 1985

[51] Int. Cl.$^4$ .............................................. B60S 9/00
[52] U.S. Cl. ............................. 200/6 R; 280/DIG. 1
[58] Field of Search ............... 280/6 R, 6 H, DIG. 1

[56] References Cited

U.S. PATENT DOCUMENTS

| | | | |
|---|---|---|---|
| 1,653,317 | 12/1927 | Stevens | 267/34 |
| 2,579,084 | 12/1951 | Krotz et al. | 267/57.1 R |
| 2,715,023 | 8/1955 | Nallinger | 267/64.16 |
| 2,921,160 | 1/1960 | Lautzenhiser | 335/126 |
| 3,321,210 | 5/1967 | Delchev | 280/6 R |
| 3,502,347 | 3/1970 | Busignies | 280/6 R |
| 3,850,437 | 11/1974 | Owen | 280/6 R |

Primary Examiner—John J. Love
Assistant Examiner—Kenneth R. Rice
Attorney, Agent, or Firm—James E. Tracy

[57] ABSTRACT

A horizontally moving vehicle body may b stabilized and held at a constant vertical level, as its wheels move up and down in response to disturbing forces, by utilizing the kinetic energy of the rotating wheels to create counter forces on the vehicle body in the direction opposite to the disturbing forces to counterbalance the disturbances. As a disturbing force moves a wheel downward (assume the wheel falls into a hole in the road), a vertical force is imparted toward (against) the vehicle body to effectively push the wheel downward and away from the body, the body thereby remaining at its normal level and not following the wheel. On the other hand, when a wheel moves upward (assume it rides over a bump in the road), the kinetic energy of the wheel is converted to a vertical force in the direction away from the vehicle body to lift the wheel upward and force it toward the body, as a result of which the body remains undisturbed at its normal level and will not follow the upward movement of the wheel.

8 Claims, 3 Drawing Figures

ACTIVE SHOCK ABSORBING SYSTEM FOR A VEHICLE

BACKGROUND OF THE INVENTION

This invention relates to an active shock absorbing system for a vehicle, namely a system in which energy is induced to create a force in the opposite direction of a disturbance on the vehicle so as to keep a constant force on the vehicle body to hold and stabilize the body at a fixed normal vertical level.

Active shock absorbers for vehicles have been developed in the past but they are of complex and expensive construction and require external energy sources, such as pneumatics or electrical energy, to cause wheel displacement. In contrast, the present invention is of relatively simple and inexpensive construction and employs the kinetic energy of the wheel itself to effect a constant force at each wheel suspension system.

SUMMARY OF THE INVENTION

The invention provides an active shock absorbing system for maintaining a horizontally moving vehicle body stable at a constant vertical level despite the presence of disturbing forces that effect vertical movements of the rotating wheels on which the body is supported. The system comprises, for for each of the wheels, sensing means for sensing a change in vertical displacement, between the vehicle body and the wheel, produced by a disturbing force on the vehicle body. Stabilizing means, controlled by the sensing means, utilizes the kinetic energy of the rotating wheel to exert a counter force on the body in the direction opposite to the disturbing force in order to counterbalance the disturbing force and hold the body at a fixed vertical level.

DESCRIPTION OF THE DRAWING

The features of the invention which are believed to be novel are set forth with particularity in the appended claims. The invention may best be understood, however, by reference to the following description in conjunction with the accompanying drawing in which:

DESCRIPTION OF THE ILLUSTRATED EMBODIMENT

Figure 1:
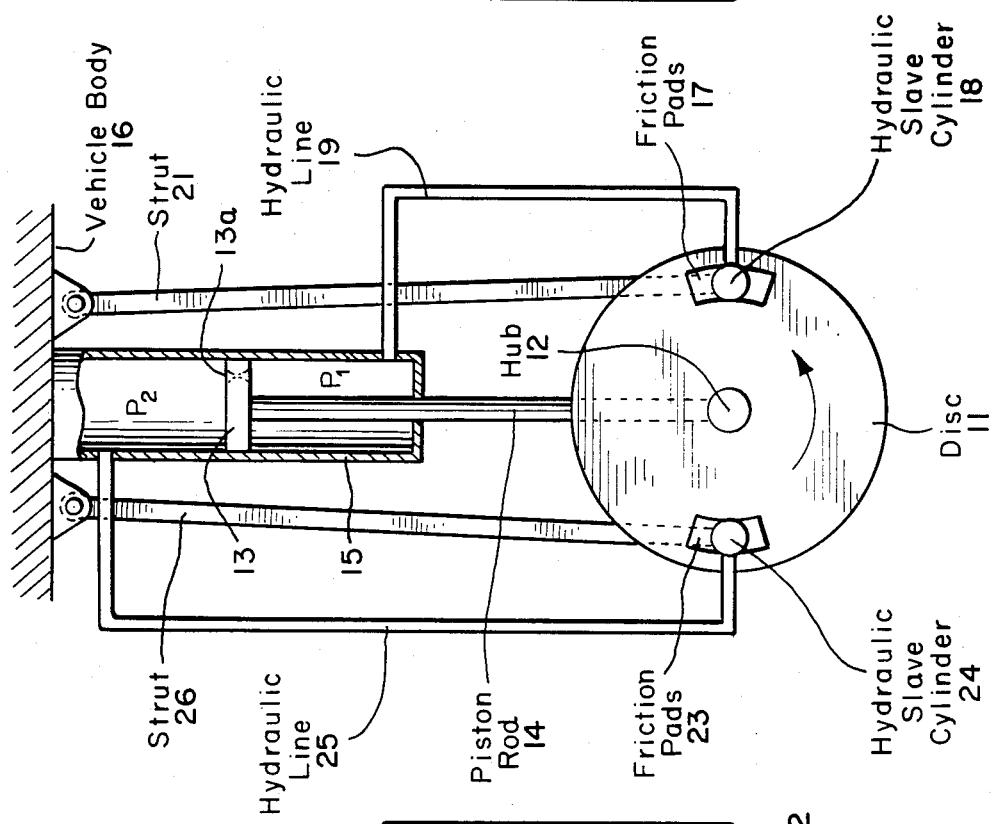
FIG. 1 illustrates an active shock absorbing system, constructed in accordance with one embodiment of the invention, and the manner in which it is coupled between a vehicle body and a wheel; in this figure the shock absorbing system is shown in its equilibrium state wherein there are no disturbances to displace the wheel either up or down.

Referring now to FIG. 1, disc 11 is fixed to and rotates with the wheel and may be similar to the disc employed in a conventional disc brake system. The direction in which disc 11 rotates, when the vehicle is moving forward, is shown by the arcuate-shaped arrow. Wheel hub 12, which is also fixed relative to disc 11, connects to piston 13 by means of piston rod 14. With this arrangement piston 13 moves vertically within hydraulic cylinder 15 (which is affixed to the vehicle body or frame 16) in response to vertical movement of the wheel and disc 11. When piston 13 moves down, the pressure $P_1$ of the hydraulic fluid below the piston in the cylindar 15 increases while the pressure $P_2$ of the fluid above the piston decreases. Conversely, when the piston is moved up, the pressure $P_2$ increases while $P_1$ decreases. Since the hydraulic fluid is almost incompressible and is within a closed system, the fluid will be forced through orifice 13a in piston 13 as the piston moves and as either pressure $P_1$ or $P_2$ is increased.

A pair of friction pads 17, which may be similar to the friction pads used in disc brakes, are mounted on disc 11 on the rear portion of the disc's periphery, namely the portion of the disc which is closest to the rear end of the vehicle. Friction pads 17 are actuated by a conventional hydraulic slave cylinder 18 (as employed in disc brakes) which connects to the lower end of cylinder 15 by means of hydraulic line 19. The distance between friction pads 17 and the vehicle body 16 is fixed by means of strut 21 which pivotally connects to both vehicle body 16 and to the assembly of friction pads 17 and slave cylinder 18. In similar fashion, a pair of friction pads 23, mounted on the front portion of disc 11, are actuated by an associated hydraulic slave cylinder 24 connected to the upper end of cylinder 15 via hydraulic line 25. Strut 26 maintains a fixed separation between vehicle body 16 and the assembly of friction pads 23 and cylinder 24.

In the equilibrium position shown in FIG. 1, pressures $P_1$ and $P_2$ are the same and neither cylinder 18 nor 24 is actuated. Hence, neither pair of friction pads is clamped to the disc and the disc rotates freely through each pair in the same manner as a disc rotates between the friction pads of unapplied disc brakes. Note that in this equilibrium state friction pads 17 and 23 are aligned with each other, 180° apart, on the same vertical level as wheel hub 12.

Figure 2:
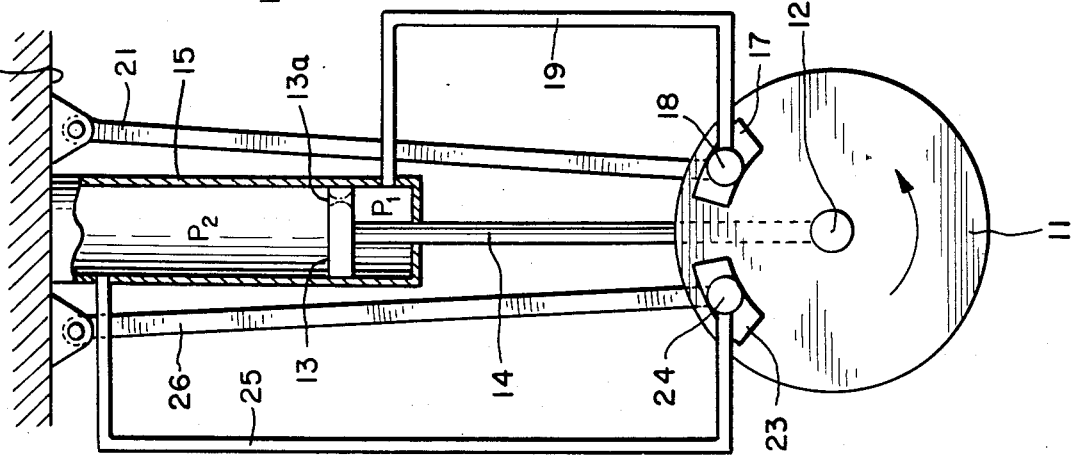
FIG. 2 shows the same apparatus as FIG. 1 except here the wheel has dropped down as would occur, for example, when the vehicle rides over a hole or dip in the road; this figure depicts the operation of the shock absorbing system during a downward displacement of the wheel; and, FIG. 3 also discloses the same arrangement as FIG. 1 except that this figure illustrates the operation of the shock absorbing system when the wheel is subject to an upward disturbance, as is the case when the vehicle rides over a bump or sharp rise in the road.

Consideration will now be given to an explanation of the operation of the active shock absorbing system when the wheel drops into a hole in the road. In the absence of the invention, the vehicle body would follow the downward movement of the wheel. With the invention, however, the disturbing force that would otherwise force the vehicle body downward will be countered by an equal and opposite force that will effectively hold the body up so that it will remain at its normal fixed vertical level. To explain, as illustrated in FIG. 2, when hub 12 shifts downwardly from its equilibrium position, piston 13 moves down and causes pressure $P_1$ to increase sufficiently to actuate cylinder 18 and effect clamping of friction pads 17 to disc 11. With pads 17, and consequently strut 21, locked to disc 11, as the wheel rotates counterclockwise in its forward direction the pads 17 will move upward along an arcuate path and will push strut 21 upwardly toward vehicle body 16. In effect, the kinetic energy of the rotating wheel produces a vertical force in the direction toward the vehicle body thereby pushing the wheel downward and away from the body. This counter force, which is imparted through strut 21 and is against the vehicle body, forces the wheel to go down without displacing the vehicle body from its normal vertical level.

Figure 3:
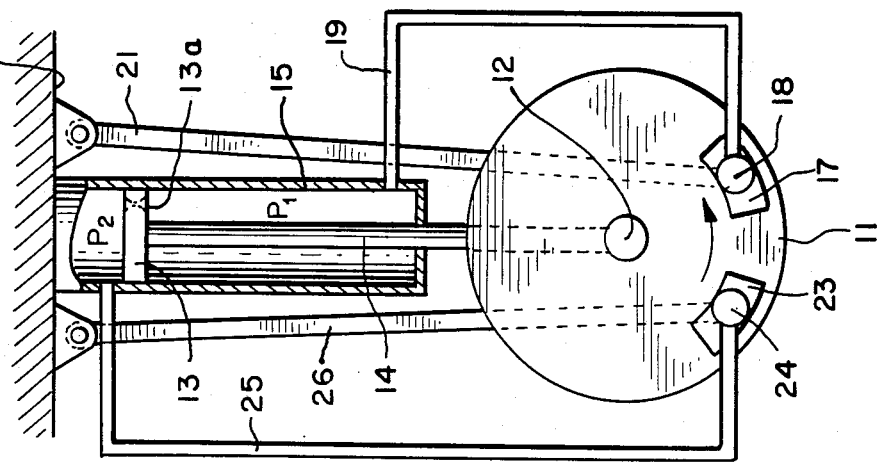

When the wheel hits a bump in the road, hub 12 shifts upwardly (see FIG. 3) causing pressure $P_2$ to increase sufficiently to effect clamping of friction pads 23 to disc 11. As the wheel rotates, the kinetic energy of the wheel pulls pads 23 and strut 26 downwardly to create a vertical force in the direction away from the vehicle which effectively lifts the wheel upward and forces it toward the vehicle body. In other words, as the wheel rolls over a bump the wheel is pulled or "sucked" upward toward the body, while at the same time the body continues along undisturbed at its normal vertical level.

To summarize the invention, cylinder 15, piston 13 and piston rod 14 constitute sensing means for sensing a change in vertical displacement, between the vehicle body and the wheel, produced by a disturbing force on the vehicle body. Disc 11, friction pads 17 and 23, cylinders 18 and 24, hydraulic lines 19 and 25, and struts 21 and 26 provide stabilizing means, controlled by the sensing means, for utilizing the kinetic energy of the rotating wheel to exert a counter force on the vehicle body in the direction opposite to the disturbing force in order to counterbalance the disturbing force and hold the body at a fixed vertical level.

It will be recognized that by means of additional hydraulic circuitry the friction pads can also be used for braking the vehicle by applying hydraulic pressure to both front and rear hydraulic slave cylinders.

It will also be appreciated that the described arrangement for extracting kinetic energy from a rotating wheel is only one of several that might be used. An example of another would be a hydraulic generator connected to a wheel having an output controllable by a sensing means to depress or elevate the wheel.

While a particular embodiment of the invention has been shown and described, modifications may be made, and it is intended in the appended claims to cover all such modifications as may fall within the true spirit and scope of the invention.

I claim:

1. An active shock absorbing system for maintaining a horizontally moving vehicle body stable at a constant vertical level despite the presence of disturbing forces that effect vertical movements of the rotating wheels on which the body is supported, said system comprising for each of the wheels:

sensing means for sensing a change in vertical displacement, between the vehicle body and the wheel, produced by a disturbing force on the vehicle body;

and stabilizing means, controlled by said sensing means, for utilizing the kinetic energy of the rotating wheel to exert a counter force on the body in the direction opposite to the disturbing force in order to counterbalance the disturbing force and hold the body at a fixed vertical level.

2. An active shock absorbing system according to claim 1 wherein said sensing means comprises a vertically-aligned hydraulic cylinder having a piston which is connected to the hub of the wheel by a piston rod, the piston moving vertically in response to vertical movement of the wheel.

3. An active shock absorbing system according to claim 2 wherein the hydraulic cylinder has one hydraulic pressure above the piston and another pressure below the piston, the pressures changing as the wheel moves vertically, one of the pressures controlling the stabilizing means when the wheel moves vertically in one direction while the other pressure controls the stabilizing means when the wheel moves in the other direction.

4. An active shock absorbing system according to claim 1 wherein the wheel includes a wheel disc having first and second pairs of hydraulically actuated friction pads, clamping of the first pair of friction pads to the disc causing the kinetic energy of the wheel to produce a vertical force in the direction toward the vehicle body thereby effectively pushing the wheel downward and away from the body, while clamping of the second pair of friction pads to the disc causes the kinetic energy to create a vertical force in the direction away from the vehicle thereby effectively lifting the wheel upward and forcing it toward the vehicle body.

5. An active shock absorbing system according to claim 4 wherein the first and second pairs of friction pads are connected to the vehicle body by first and second struts, respectively, through which struts the vertical forces are imparted when the associated friction pads are actuated.

6. An active shock absorbing system according to claim 5 wherein the first and second pairs of friction pads are arcuately moveable around portions of the disc's periphery but are aligned with each other, 180° apart, on the same vertical level as the wheel hub when unactuated and when the wheel is in its equilibrium position, the second pair being in front of the first pair, the first pair moving upward when clamped to the rotating disc thereby imparting a force through the first strut and against the vehicle body to effectively push the wheel down and away from the body, whereas the second pair of friction pads moves downward when clamped to the rotating disc thereby exerting a force through the second strut and away from the vehicle body to effectively pull the wheel upward toward the body.

7. An active shock absorbing system according to claim 6 wherein said sensing means comprises a vertically-aligned hydraulic cylinder having a piston which is connected to the wheel hub by a piston rod, the piston moving vertically in response to vertical movement of the wheel, the hydraulic cylinder having a first hydraulic pressure below the piston which increases as the wheel moves downward and which is employed to control the actuation of the first pair of friction pads and having a second hydraulic pressure above the piston which increases as the wheel moves upward and which is utilized to control the actuation of the second pair of friction pads.

8. An active shock absorbing system for maintaining a horizontally moving vehicle body stable at a constant vertical level despite the presence of disturbing forces that effect vertical movements of the rotating wheels on which the body is supported, said system comprising for each of the wheels:

sensing means for sensing a change in vertical displacement of the vehicle body;

and stabilizing means, controlled by said sensing means, for utilizing the kinetic energy of the rotating wheel to exert a force on the body to hold the body at a fixed vertical level.

* * * * *